United States Patent
Subburaj et al.

(10) Patent No.: US 10,234,542 B2
(45) Date of Patent: Mar. 19, 2019

(54) MEASUREMENT OF TRANSCEIVER PERFORMANCE PARAMETERS IN A RADAR SYSTEM

(71) Applicant: Texas Instruments Incorporated, Dallas, TX (US)

(72) Inventors: Karthik Subburaj, Bangalore (IN); Brian Paul Ginsburg, Allen, TX (US); Daniel Colum Breen, Richardson, TX (US); Sandeep Rao, Bangalore (IN); Karthik Ramasubramanian, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 592 days.

(21) Appl. No.: 14/870,129

(22) Filed: Sep. 30, 2015

(65) Prior Publication Data
US 2017/0090014 A1     Mar. 30, 2017

(51) Int. Cl.
*G01S 7/03* (2006.01)
*G01S 7/35* (2006.01)
(Continued)

(52) U.S. Cl.
CPC ............ *G01S 7/4004* (2013.01); *G01S 7/032* (2013.01); *G01S 7/35* (2013.01); *G01S 7/4052* (2013.01);
(Continued)

(58) Field of Classification Search
CPC .... G01S 7/4004; G01S 7/4021; G01S 7/4056; G01S 2007/406; G01S 2007/4065; G01S 2007/4069
See application file for complete search history.

(56) References Cited

U.S. PATENT DOCUMENTS 3,471,855 A * 10/1969 Thompson ............ G01S 7/4021
                                                              342/165
4,319,247 A *  3/1982 Warren .................... G01S 7/40
                                                              342/171
(Continued)

FOREIGN PATENT DOCUMENTS

CN         104889705            9/2015
DE          19744731            5/1999
(Continued)

OTHER PUBLICATIONS

Bon-Hyun Ku, et al., "A High-Linearity 76-95-GHz 16-Element 8-Transmit/8-Receive Phases-Array Chip with High Isolation and Flip-Chip Packa", IEEE Transactions on Microwave Theory and Techniques, Plenum, USA, vol. 62, No. 10, Oct. 1, 2014, pp. 2337-2356, XP011560375, ISSN: 0018-9480, DOI: 10.1109/TMTT. 2014.2341212.
(Continued)

*Primary Examiner* — Peter M Bythrow
(74) *Attorney, Agent, or Firm* — Ebby Abraham; Charles A. Brill; Frank D. Cimino (57) ABSTRACT

Methods for monitoring of performance parameters of one or more receive channels and/or one or more transmit channels of a radar system-on-a-chip (SOC) are provided. The radar SOC may include a loopback path coupling at least one transmit channel to at least one receive channel to provide a test signal from the at least one transmit channel to the at least one receive channel when the radar SOC is operated in test mode. In some embodiments, the loopback path includes a combiner coupled to each of one or more transmit channels, a splitter coupled to each of one or more receive channels, and a single wire coupling an output of the combiner to an input of the splitter.

1 Claim, 7 Drawing Sheets

(51) Int. Cl.
*G01S 7/40* (2006.01)
*G01S 13/02* (2006.01)
*G01S 13/93* (2006.01)

(52) U.S. Cl.
CPC ......... *G01S 7/4056* (2013.01); *G01S 13/931* (2013.01); *G01S 13/0209* (2013.01); *G01S 2007/4065* (2013.01); *G01S 2007/4069* (2013.01)

(56) References Cited

U.S. PATENT DOCUMENTS

| | | | | |
|---|---|---|---|---|
| 4,538,150 | A * | 8/1985 | Bone, Jr. | G01S 7/4021 342/123 |
| 4,661,818 | A * | 4/1987 | Riffiod | G01S 7/4056 342/172 |
| 4,683,473 | A * | 7/1987 | Haugland | G01S 7/4052 342/15 |
| 4,945,360 | A * | 7/1990 | Trummer | G01S 7/35 342/122 |
| 5,160,933 | A * | 11/1992 | Hager | G01S 7/4052 342/120 |
| 5,223,840 | A * | 6/1993 | Cronyn | G01S 7/4052 342/170 |
| 5,300,934 | A * | 4/1994 | Asbell | G01S 7/4052 342/172 |
| 5,432,516 | A * | 7/1995 | Cherry | G01S 7/4056 340/435 |
| 5,841,393 | A | 11/1998 | Saito et al. | |
| 6,437,730 | B1 * | 8/2002 | Orlandi | G01S 7/4004 342/122 |
| 6,476,759 | B2 * | 11/2002 | Orlandi | G01S 7/4056 342/120 |
| 6,812,885 | B2 * | 11/2004 | Brettner | G01S 7/4004 342/118 |
| 7,705,773 | B2 * | 4/2010 | Vacanti | G01S 7/35 342/169 |
| 7,724,182 | B2 * | 5/2010 | Inoue | G01S 7/4004 342/165 |
| 8,044,842 | B2 * | 10/2011 | Thomas | G01S 13/882 342/120 |
| 9,470,781 | B2 * | 10/2016 | Hesse | G01S 7/4008 |
| 9,910,135 | B2 * | 3/2018 | Jenkins | G01S 7/4056 |
| 2007/0139261 | A1 * | 6/2007 | Vacanti | G01S 7/35 342/174 |
| 2012/0050094 | A1 * | 3/2012 | Nakabayashi | G01S 7/03 342/174 |
| 2014/0340254 | A1 * | 11/2014 | Hesse | G01S 7/4008 342/173 |
| 2015/0362584 | A1 * | 12/2015 | Jenkins | G01S 7/4056 342/171 |

FOREIGN PATENT DOCUMENTS

| | | |
|---|---|---|
| EP | 2773044 | 3/2014 |
| JP | 1010227 | 1/1998 |

OTHER PUBLICATIONS

Dave Saunders, et al., "A Single-Chip 24 GHz SiGe BiCMOS Transceiver for FMCW Automotive Radars", Radio Frequency Integrated Circuits Symposium, 2009, RFIC 2009, IEEE, IEEE, Piscataway, NJ, USA. Jun. 7, 2009, pp. 459-462, XP031480316, ISBN: 978-1-4244-3377-3.

* cited by examiner

MEASUREMENT OF TRANSCEIVER PERFORMANCE PARAMETERS IN A RADAR SYSTEM

BACKGROUND OF THE DISCLOSURE

Field of the Disclosure

Embodiments of the present disclosure generally relate to radar systems, and more specifically relate to measurement of transceiver performance parameters in radar systems.

Description of the Related Art

A new class of safety systems, referred to as advanced driver assistance systems (ADAS), has been introduced into automobiles to reduce human operation error. These systems are enabled by smart sensors based primarily on millimeter-wave automotive radars. The proliferation of such assistance systems, which may provide functionality such as rear-view facing cameras, electronic stability control, and vision-based pedestrian detection systems, has been enabled in part by improvements in microcontroller and sensor technologies. Enhanced embedded radar-based solutions are enabling complementary safety features for ADAS designers.

In an automotive radar system, one or more radar sensors may be used to detect obstacles around the vehicle and the speeds of the detected objects relative to the vehicle. A processing unit in the radar system may determine the appropriate action needed, e.g., to avoid a collision or to reduce collateral damage, based on signals generated by the radar sensors. Current automotive radar systems are capable of detecting objects and obstacles around a vehicle, the position of any detected objects and obstacles relative to the vehicle, and the speed of any detected objects and obstacles relative to the vehicle. Via the processing unit, the radar system may, for example, alert the vehicle driver about potential danger, prevent a collision by controlling the vehicle in a dangerous situation, take over partial control of the vehicle, or assist the driver with parking the vehicle.

Automotive radar systems are required to meet the functional safety specifications of International Standard 26262 titled "Road Vehicles—Functional Safety." ISO 26262 defines functional safety as the absence of unreasonable risk caused by malfunctioning behavior of electrical/electronic systems. Functional safety in automotive radar is the prevention of harm to humans due to failure of components in the radar. For automotive radar, the radar should be known to be functioning appropriately within a fault tolerant time interval of approximately 100 milliseconds (ms). Thus, while the vehicle is operating, a failure in any part of the radar that would lead to a degraded signal-to-noise ratio (SNR) or false detection of presence or position of obstacles should be detected, and an appropriate response performed within approximately 100 ms.

SUMMARY

Embodiments of the present disclosure relate to methods and apparatus for measurement of transceiver performance parameters in a radar system. In one aspect, a radar system-on-a-chip (SOC) configured for monitoring one or more performance parameters is provided that includes one or more receive channels, one or more transmit channels, transmission generation circuitry coupled to the one or more transmit channels, the transmission generation circuitry operable to generate a continuous wave signal when the radar SOC is operated in test mode, and a loopback path coupling the one or more transmit channels to the one or more receive channels, the loopback path including a combiner coupled to the one or more transmit channels, a splitter coupled to the one or more channels, and a single wire coupling an output of the combiner to an input of the splitter, the loopback path operable to provide a test signal from at least one transmit channel receiving the continuous wave signal to at least one receive channel when the radar SOC is operated in test mode.

In one aspect, a radar system-on-a-chip (SOC) configured for monitoring one or more performance parameters is provided that includes one or more receive channels, one or more transmit channels, and transmission generation circuitry coupled to the one or more transmit channels, the transmission generation circuitry operable to generate a continuous wave signal when the radar SOC is operated in test mode.

In one aspect, a radar system-on-a-chip configured for monitoring one or more performance parameters is provided that includes a plurality of receive channels, a plurality of transmit channels, transmission generation circuitry coupled to the plurality of transmit channels, the transmission generation circuitry operable to generate a continuous wave signal when the radar SOC is operated in test mode, and a loopback path coupling the plurality of transmit channels to the plurality of receive channels, the loopback path including a first combiner coupled to an output of a programmable shifter included in each transmit channel, a second combiner coupled to an output of a power amplifier chain in each transmit channel, a frequency shifter coupled to an output of the second combiner, a third combiner coupled to outputs of the first combiner and the frequency shifter, a splitter coupled to an input of each the receive channels, and a single wire coupling an output of the third combiner to an input of the splitter, the loopback path operable to provide a test signal from at least one transmit channel receiving the continuous wave signal to the receive channels when the radar SOC is operated in test mode.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency.

Embodiments of the disclosure provide for monitoring of performance in a radar system-on-a-chip (SOC), i.e., a radar transceiver integrated circuit, as the radar SOC is used, e.g., in an operating vehicle. More specifically, in various embodiments, performance of receive channels and/or transmit channels of a radar SOC may be measured based on test signals captured on the SOC. The test signals may be used, for example, to detect gain and phase response mismatches among multiple receive channels and/or among multiple transmit channels, noise and spurious tone levels in the receive channels and/or transmit channels, and/or nonlinearity of receive channels. In various embodiments, rather than having a wire coupling each transmit channel/receive channel pair for transmitting test signals from the transmit channel to the receive channel, one or more transmit channels of the SOC are coupled to a combiner and the output of the combiner is routed via a single wire to a splitter coupled to one or more of the receive channels.

Figure 1:
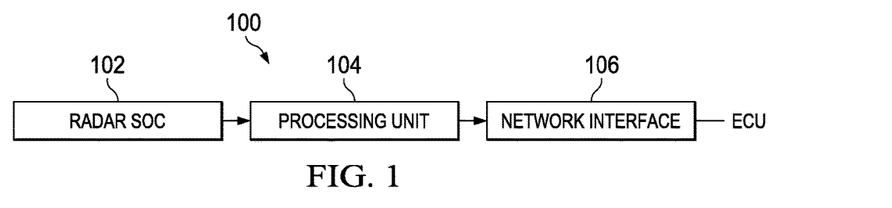
FIG. 1 is a block diagram of an example Frequency Modulated Continuous Wave (FMCW) radar system configured to perform performance monitoring during operation of the radar system.

FIG. 1 is a block diagram of an example Frequency Modulated Continuous Wave (FMCW) radar system 100 configured to perform performance monitoring during operation of the radar system 100. The example FMCW radar system 100 includes a radar system-on-a-chip (SOC) 102, a processing unit 104, and a network interface 106. The architecture of various embodiments the radar SOC 102 is described in reference to FIGS. 2-5.

The radar SOC 102 is coupled to the processing unit 104 via a high speed serial interface. As is explained in more detail in reference to FIG. 2, the radar SOC 102 includes functionality to generate multiple digital intermediate frequency (IF) signals (alternatively referred to as dechirped signals, beat signals, or raw radar signals) that are provided to the processing unit 104 via the high speed serial interface. Further, as described in more detail in reference to FIGS. 3, 4, and 5, various embodiments of the radar SOC 102 are configured to generate test data for receive channels and/or transmit channels of the SOC 102 and to provide the test data to the processing unit 104 to be used for monitoring of performance parameters of the receive channels and/or transmit channels.

The processing unit 104 includes functionality to perform radar signal processing, i.e., to process the received radar signals to determine, for example, distance, velocity, and angle of any detected objects. The processing unit 104 may also include functionality to perform post processing of the information about the detected objects, such as tracking objects, determining rate and direction of movement, etc. Further, the processing unit 104 includes functionality to perform performance monitoring based on test data provided by the radar SOC 102 and to perform mitigation based on conditions detected by the performance monitoring. Test data and options for performance monitoring are described in more detail herein.

The processing unit 104 may include any suitable processor or combination of processors as needed for the processing throughput of the application using the radar data. For example, the processing unit 104 may include a digital signal processor (DSP), a microcontroller (MCU), an SOC combining both DSP and MCU processing, or a field programmable gate array (FPGA) and a DSP.

The processing unit 104 provides control information as needed to one or more electronic control units in the vehicle via the network interface 106. Electronic control unit (ECU) is a generic term for any embedded system in a vehicle that controls one or more the electrical system or subsystems in the vehicle. Types of ECU include, for example, electronic/engine control module (ECM), power train control module (PCM), transmission control module (TCM), brake control module (BCM or EBCM), central control module (CCM), central timing module (CTM), general electronic module (GEM), body control module (BCM), and suspension control module (SCM).

The network interface 106 may implement any suitable protocol, such as, for example, the controller area network (CAN) protocol, the FlexRay protocol, or Ethernet protocol.

Figure 2:
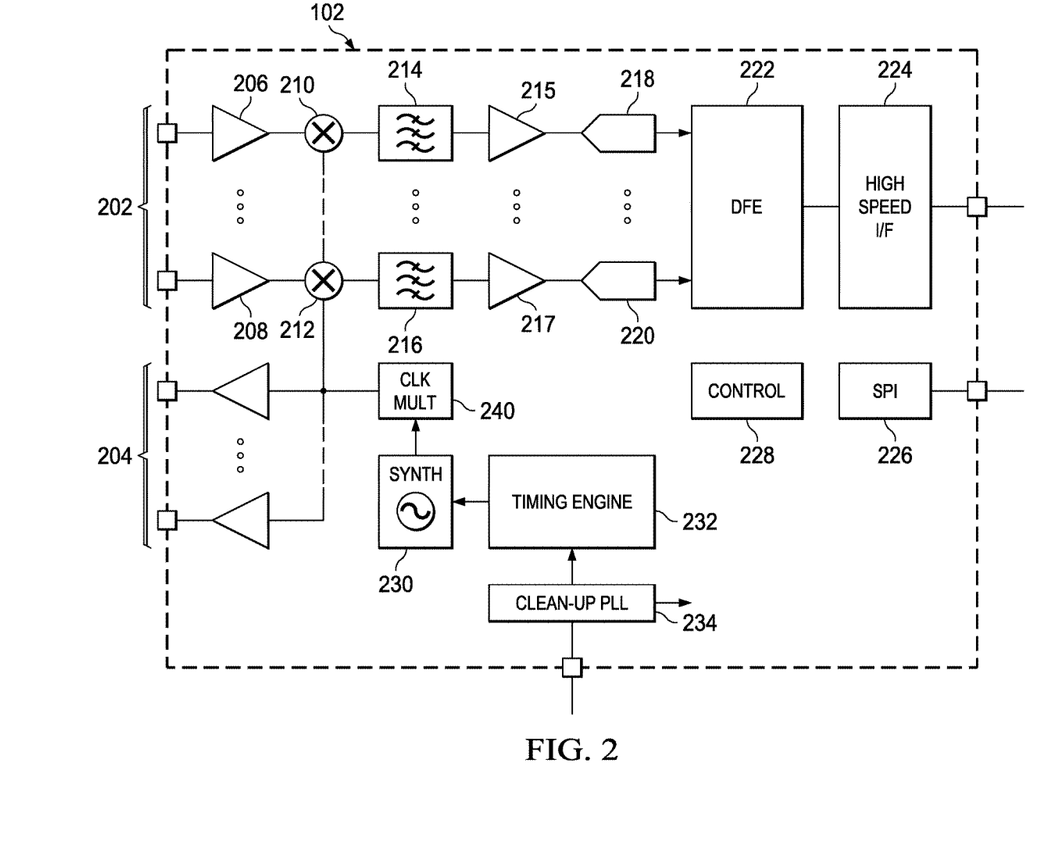
FIG. 2 is a block diagram of an example radar system-on-a chip (SOC)

FIG. 2 is a block diagram of an example radar SOC 102. The radar SOC 102 may include multiple transmit channels 204 for transmitting FMCW signals and multiple receive channels 202 for receiving the reflected transmitted signals. Further, the number of receive channels may be larger than the number of transmit channels. For example, an embodiment of the radar SOC 102 may have two transmit channels and four receive channels.

A transmit channel includes a suitable transmitter and antenna. A receive channel includes a suitable receiver and antenna. Further, each of the receive channels 202 are identical and include a low-noise amplifier (LNA) 206, 208 to amplify the received signal, a mixer 210, 212 to mix the signal generated by the transmission generation circuitry with the received signal to generate an IF signal, a baseband bandpass filter 214, 216 for filtering the IF signal, a variable gain amplifier (VGA) 215, 217 for amplifying the filtered IF signal, and an analog-to-digital converter (ADC) 218, 220 for converting the analog IF signal to a digital IF signal. The mixer serves as a down converter that generates an output signal with a frequency equal to the difference between the frequency of the inputs received from the low-noise amplifier and the transmission generation circuitry, both of which are radio frequency (RF) signals. The bandpass filter, VGA, and ADC of a receive channel may be collectively referred to as a baseband chain or baseband filter chain. Further, the bandpass filter and VGA may be collectively referred to as an IF amplifier (IFA).

The receive channels 202 are coupled to the digital front end (DFE) component 222 to provide the digital IF signals to the DFE 222. The DFE 222 includes functionality to perform decimation filtering on the digital IF signals to reduce the data transfer rate. The DFE 222 may also perform other operations on the digital IF signals, e.g., DC offset removal, digital compensation of non-idealities in the receive channels, such as inter-RX gain imbalance non-ideality, inter-RX phase imbalance non-ideality and the like. The DFE 222 is coupled to the high speed serial interface (I/F) 224 to transfer decimated digital IF signals to the processing unit 106 when the radar SOC 102 is in normal mode. In some embodiments, the DFE is also coupled to the control module 228 to transfer digital test signals to the control module 228 when the radar SOC 102 is in test mode.

The serial peripheral interface (SPI) 226 provides an interface for communication with the processing unit 106. For example, the processing unit 106 may use the SPI 226 to send control information, e.g., timing and frequencies of chirps, output power level, triggering of monitoring functions, etc., to the control module 228. The radar SOC 102 may use the SPI 226, for example, to send test data to the processing unit 106.

The control module 228 includes functionality to control the operation of the radar SOC 102 in normal mode and in test mode. The control module 228 may include, for example, a buffer to store output samples of the DFE 222, an FFT (Fast Fourier Transform) engine to compute spectral information of the buffer contents, and an MCU that executes firmware to control the operation of the radar SOC 102 in normal mode and in test mode. Functionality of the control module 228 is described in more detail in reference to the methods of FIGS. 6-10.

The programmable timing engine 232 includes functionality to receive chirp parameter values for a sequence of chirps in a radar frame from the control module 228 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, a chirp duration, indicators of when the transmit channels should transmit and when the DFE output digital should be collected for further radar processing, etc. One or more of these parameters may be programmable.

The radio frequency synthesizer (SYNTH) 230 includes functionality to generate FMCW signals for transmission based on chirp control signals from the timing engine 232. In some embodiments, the SYNTH 230 includes a phase locked loop (PLL) with a voltage controlled oscillator (VCO).

The clock multiplier 240 increases the frequency of the transmission signal (LO signal) to the LO frequency of the mixers 206, 208. The clean-up PLL (phase locked loop) 234 operates to increase the frequency of the signal of an external low frequency reference clock (not shown) to the frequency of the SYNTH 230 and to filter the reference clock phase noise out of the clock signal.

The clock multiplier 240, synthesizer 230, timing generator 232, and clean up PLL 234 are an example of transmission generation circuitry. The transmission generation circuitry generates a radio frequency (RF) signal as input to the transmit channels and as input to the mixers in the receive channels via the clock multiplier. The output of the transmission generation circuitry may be referred to as the LO (local oscillator) signal or the FMCW signal.

Figure 3:
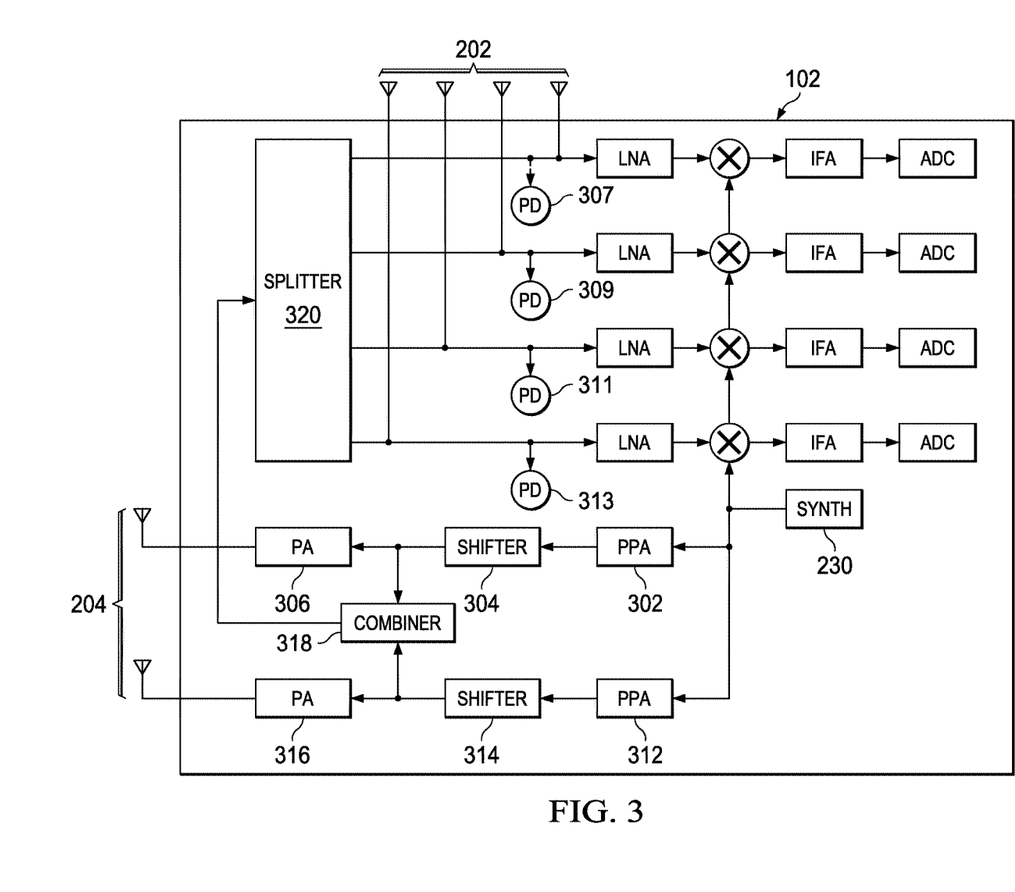
FIGS. 3, 4, and 5 are simplified block diagrams of example embodiments of the radar SOC of FIG. 2 in which the radar SOC is configured to measure performance parameters of the receive channels and/or transmit channels.
Figure 4:
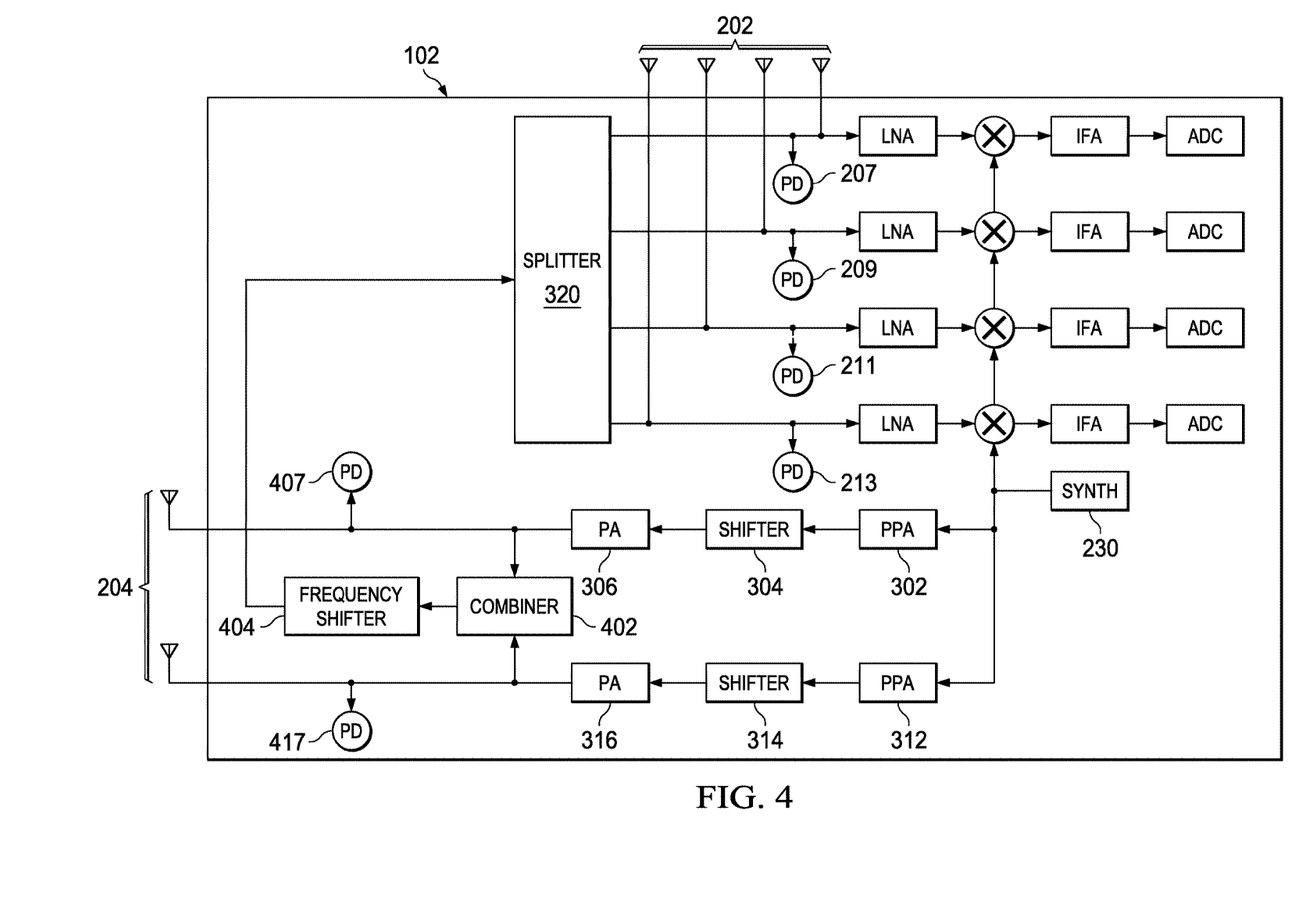
Figure 5:
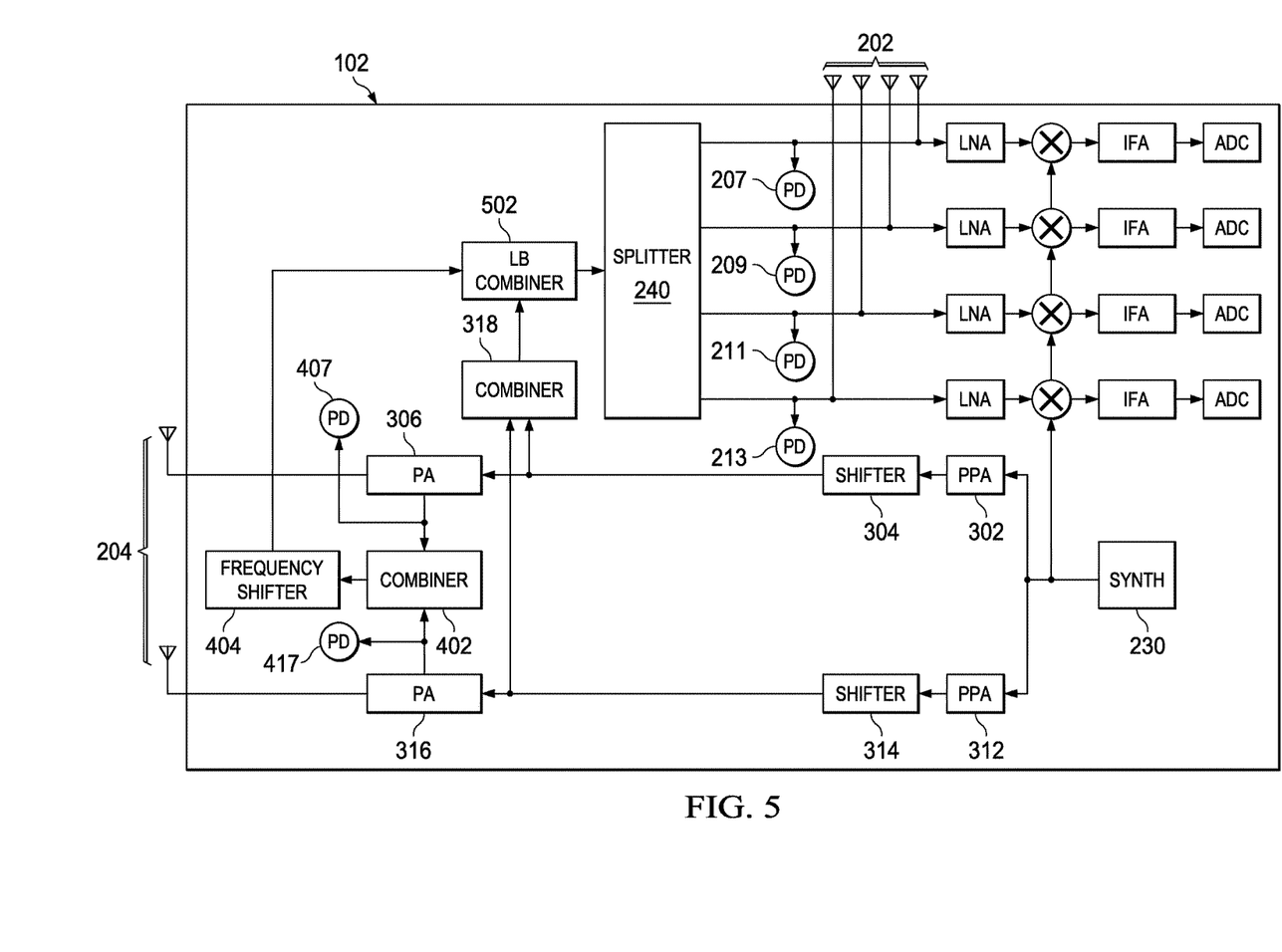

FIGS. 3, 4, and 5 are simplified block diagrams of example embodiments of the radar SOC 102 of FIG. 2 in which the radar SOC 102 is configured to measure performance parameters of the receivers and/or transmitters. For simplicity of explanation, the depicted embodiments each have four receive channels and two transmit channels. One of ordinary skill in the art will understand embodiments in which the number of receive channels and/or the number of transmit channels may differ. Note that in these methods, the transmission generation circuitry is configured to generate a continuous wave signal with a zero slope when the radar SOC is operated in test mode, i.e., an LO signal with a continuous RF wave with constant frequency. When the radar SOC is operated in normal mode, the output of the transmission generation circuitry is an RF signal that changes frequency over time, e.g., the frequency of the RF signal changes from 77 GHz to 81 GHz over time 0 to 100 us in response to chirp control parameters, resulting in reflected signals as a delayed version of the transmitted signals and the mixer in each receive channel outputting an IF signal proportional to the round trip delay.

Each of the block diagrams of FIGS. 3, 4, and 5 includes at least one combiner. In general, a combiner may be a hardware circuit that adds input signals to form an output signal. If the combiner receives a single input signal, then that signal is output by the combiner. In some embodiments, the combiner may apply a programmable gain or attenuation to each input signal prior to adding the signals. In some embodiments, a combiner may be symmetric such that the gain, attenuation and/or delay of each input signal to the combiner output is significantly similar.

Referring now to FIG. 3, the example FMCW radar SOC 102 depicted is configured to provide internal loopback of signals generated in the transmit channels 204 to each of the receive channels 202 when the SOC 102 is operated in test mode. As is explained in more detail in reference to the method of FIG. 6, this configuration may be used to determine inter-receive channel gain and phase mismatch at differing radio and intermediate frequencies. Further, as is explained in more detail in reference to the method of FIG. 7, this configuration may be used to determine a noise figure for a receive channel 202. In addition, as explained in more detail in reference to the method of FIG. 10, this configuration may be used to determine non linearity metrics in a receive channel 202.

The two transmit channels each incorporate a signal power amplifier chain of a pre-power amplifier (PPA) 302, 312 coupled to the SYNTH 230 to receive the FMCW signal, a programmable shifter 304, 314 coupled to the PPA 302, 312 to receive the amplified signal, and a power amplifier (PA) 306, 316 coupled to the shifter 304, 314 to receive the shifted signal. In some embodiments, the shifter 304, 314 may be programmed for both frequency and phase shifting. That is, the output signal of a shifter 304, 314 may have a frequency equal to the input frequency plus a programmable offset frequency and a phase equal to the input phase plus a programmable offset phase. The combiner 318 is coupled to the outputs of the shifters 304, 314 to receive and combine the shifted signals. The combiner 318 is also coupled to the splitter 320 to provide the combined signal to the splitter.

The splitter 320 is coupled to each of the receive channels 202. The splitter 320 splits the combined signal from the combiner 318 to provide signals of equal power and phase to each of the receive channels 202. The splitter 320 may be symmetric such that the gain, attenuation, and/or delay on the signal from the splitter input to the LNAs of each of the receive channels 202 are significantly similar.

Each receive channel 202 includes a radio frequency (RF) power detector 307, 309, 311, 313 coupled between the splitter 320 and the low-noise amplifier (LNA). The power detectors 307, 309, 311, 313 measure the power of the combined signal from the combiner 308. This power measurement may also be referred to as the received signal strength indicator (RSSI). The power detectors 307, 309, 311, 313 are coupled to the control module 228 to provide the power measurements to the control module 228. In some embodiments, the power detectors 307, 309, 311, 313 may each incorporate a power detection sensor and an analog-to-digital converter to convert the power measurement from the sensor to a digital power measurement. As is explained in more detail herein, the outputs (power measurements) of the power detectors 307, 309, 311, 313 may be accessed by the control module 228 when the radar SOC is operated in test mode.

Referring now to FIG. 4, the example FMCW radar SOC depicted is configured to provide internal loop back of signals generated in the transmit channels 204 to each of the receive channels 202 when the SOC 102 is operated in test mode. As is explained in more detail in reference to the method of FIG. 8, this configuration may be used to determine power and phase mismatches among the transmit channels 204.

In this example, the combiner 402 is coupled to each of the power amplifier chains of the transmit channels 204 to receive the signals from the power amplifier chains and combine the two signals to generate a single signal. The combiner 402 may be symmetric such that the gain and/or delay on the signal from each transmit channel to the combiner output are significantly similar.

The combiner 402 is also coupled to the frequency shifter 404 to provide the combined signal to the frequency shifter 404. The frequency shifter 404 may be, for example, an on off keying (OOK) modulator or a binary phase shift keying (BPSK) modulator. One example of an OOK modulator is a circuit that achieves a frequency shift Fshift in an input signal by alternatively outputting the input signal for a duration of 0.5/Fshift and zero for a duration of 0.5/Fshift. One example of a BPSK modulator is a circuit that achieves a frequency shift Fshift in an input signal by alternatively outputting the input signal with one polarity for a duration of 0.5/Fshift and outputting the input signal with the opposite polarity for a duration of 0.5/Fshift. The frequency shifter 404 is coupled to the splitter 320 to provide the frequency shifted combined signal to the splitter 320.

Each transmit channel 204 includes a radio frequency (RF) power detector 407, 417 coupled to the PA 306, 316 output. Each power detector 407, 417 measures the power of the signal output from the respective PA 306, 316. The power detectors 407, 417 are coupled to the control module 228 to provide the power measurements to the control module 228. In some embodiments, the power detectors 407, 417 may each incorporate a power detection sensor and an analog-to-digital converter to convert the power measurement from the sensor to a digital power measurement. As is explained in more detail herein, the outputs (power measurements) of the power detectors 407, 417 may be accessed by the control module 228 when the radar SOC is operated in test mode.

Referring now to FIG. 5, the example FMCW radar SOC depicted is a combination of the example of FIG. 3 and the example of FIG. 4, and thus may perform any of the methods described herein when the SOC 102 is operated in test mode. A loop-back (LB) combiner 502 is added. The LB combiner 502 is coupled between the frequency shifter 404 and the splitter 240 to receive the combined signal from the power amplifier chains of the transmit channels 204. The LB combiner 502 is also coupled between the combiner 318 and the splitter 240 to receive the signal output from the combiner 318.

FIGS. 6-10 are flow diagrams for methods for determining various performance parameters of the radar SOC 102 when the SOC 102 is operated in test mode and is configured appropriately. These methods may be performed under the control of the control module 228. That is, the control module 228 may configure the loopback path(s) and other components as needed to perform the desired measurement. Further, in these methods, test results, i.e., performance parameter values, determined by the control module 228 are reported to a safety processor.

Figure 6:
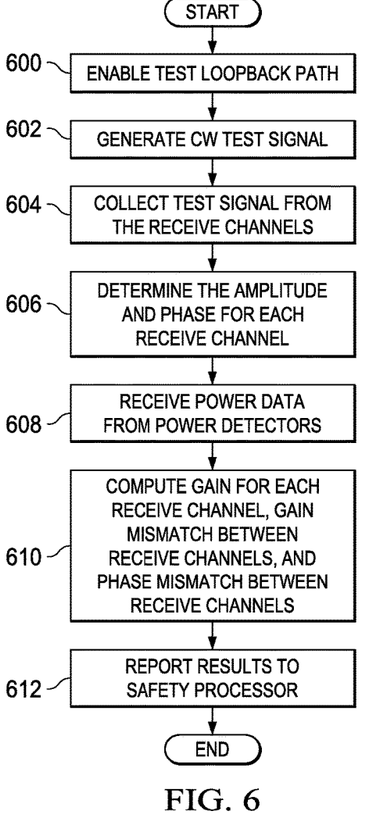
FIGS. 6, 7, 8, 9, and 10 are flow diagrams of methods.

In general, the safety processor receives the performance parameter values and performs one or more actions based on the parameter values. For example, the safety processor may compare the parameter values to predetermined thresholds and notify affected entities if a threshold is crossed. In another example, one or more of the parameter values may cause the modification of data received from the radar regarding the presence, position, and velocity of a detected object. In the method descriptions below, the safety processor is assumed to be the processing unit 104 for simplicity of description FIG. 6 is a flow diagram of a method for determining gain and phase mismatches among the receive channels 202 of the radar SOC 102. This method may be performed, for example, in the example embodiment of FIG. 3 and the example embodiment of FIG. 5. This method can be performed at any combination of radio and intermediate frequencies. For example, for a 77-81 GHz radar, the radio frequency (RF) may be 77, 79, or 81 GHz and typical intermediate frequencies (IF) used for performance monitoring may be 15, 10, 5, 2, 1, 0.5, or 0.1 MHz. In the following description RF=80 GHz, and IF=1 MHz are used as an example.

As shown in FIG. 6, the loopback path from one of the transmit channels 204 to the receive channels 202 is enabled 600 by the control module 228. In the example SOC 102 of FIG. 3, the loopback path includes the PPA and Shifter of the selected transmit channel, the combiner 318, and the splitter 320. In the example SOC 102 of FIG. 5, the loopback path also includes the LB combiner 502. Further, the other loopback path through the PA, the combiner 402, and the frequency shifter 404 is not enabled.

The control module 228 further causes the generation 602 of a continuous wave (CW) test signal, e.g., 80 GHz+1 MHz, that passes through the loopback path from the selected transmit channel. The CW test signal may be generated by setting the frequency of the local oscillator (LO) signal from the SYNTH 230 to 80 GHz and programming the shifter in the power amplifier chain to add a frequency of 1 MHz to the LO signal.

The test signal passes through the splitter 320 to each of the receive channels 202 and the control module 228 collects 604 digital test data signal from each of the receive channels. In some embodiments, the control module 228 collects the signal from the output of the ADC in each receive channel 202. In other embodiments, the control module 228 collects the signal from an output of the DFE 222. The data collection from the receive channels 202 is performed simultaneously and synchronously, i.e., the data collection from the four receive channels 202 is initiated at the same time.

The control module 228 performs a Fast Fourier Transform (FFT) on the test data signal and determines 606 the amplitude $A_i$ and the phase $\theta_i$ (i=1 . . . 4) of the test data signal simultaneously and synchronously received in each of the four receive channels 202. The amplitude $A_i$ and the phase $\theta_i$ of the test signal received in a receive channel may be determined as follows. Assume for ease of explanation that Ns samples of ADC data are collected at a sampling rate Fs, e.g., Ns=1024 and Fs=10.24 MHz, and an Ns point FFT is performed to produce Ns FFT output complex samples referred to as FFTOut[0, 1, 2, . . . Ns−1]. Note that the period during which DFE output is collected may be programmed as Ns/Fs and the chirp duration may be equal to or slightly exceed Ns/Fs. The FFT output sample index, indx, corresponding to the test data signal of frequency IF is given by IF/Fs*Ns. The value of FFTOut[indx] is a complex number, denoted by X+jY. The amplitude of this number is given by $A=sqrt(X^2+Y^2)$/Ns and the phase is given by $\theta=arctan(Y/X)$. The control module 228 also receives 608 power data $P_i$ from each of the power detectors 307, 309, 311, 313 for the corresponding receive channels 202.

The control module 228 then computes 610 the following performance parameters: gain for each receive channel, the gain mismatch between receive channels and the phase mismatch between receive channels. These parameter values are reported 612 to the safety processor 104. The gain for a receive channel i may be computed as $$Gain_i = 20 \log A_i - P_i.$$

If the loopback path is symmetrically designed across the receive channels, the gain may be computed without using the power data, i.e., $$Gain_i = 20 \log A_i.$$

For the sake of simplicity and ease of explanation, some constant additive terms have not been shown on the right hand side of the above gain computation equation. These constant terms are common and well known to radio designers. For example, there may be more additive constant terms for matching the units of P and A. For example, the value of A indicates the signal level ("how many LSBs") at the ADC in the receive channel, while the value of P indicates the value of power detected ("dBmilliWatt" or "dBWatt") at the input of the receive channel LNA. In order to match the units of A and P, a constant such as $$10 * \log\left(\frac{ADCFullScale^2}{2^{NumBits} * \text{Resistance}}\right)$$

may be added to the above equation for such a purpose, where ADCFullScale is the ADC full scale voltage, e.g., 1 volt, (typical 1 volt), NumBits is the number of bits in each ADC output word, and Resistance may be, for example, the typical 50 Ohm resistance. There may be other similar design constants to normalize for other standard concepts known to radio designers.

The gain mismatch between two receive channels i and j may be computed as $$\text{GainMismatch}_{i,j} = \text{Gain}_i - \text{Gain}_j.$$

The phase mismatch between two receive channels i and j may be computed as $$\text{PhaseMismatch}_{i,j} = \theta_i - \theta_j.$$

The above method may be used to find gain, gain mismatch, and phase mismatch at various radio frequencies and intermediate frequencies. For example, the method may be used to compute these parameters at each of RF=77 GHz, 79 GHz, 81 GHz, all with IF set to, e.g., 1 MHz. This helps to determine if the gains and phases are well matched among the multiple receive channels across the range of desired radio frequencies. In another example, the method may be used to compute these parameters at each of IF=1 MHz, 5 MHz, 10 MHz, all with RF set to, e.g., 79 GHz. This helps to determine if the gains and phases are well matched among the multiple receive channels across the range of desired intermediate frequencies.

Figure 7:
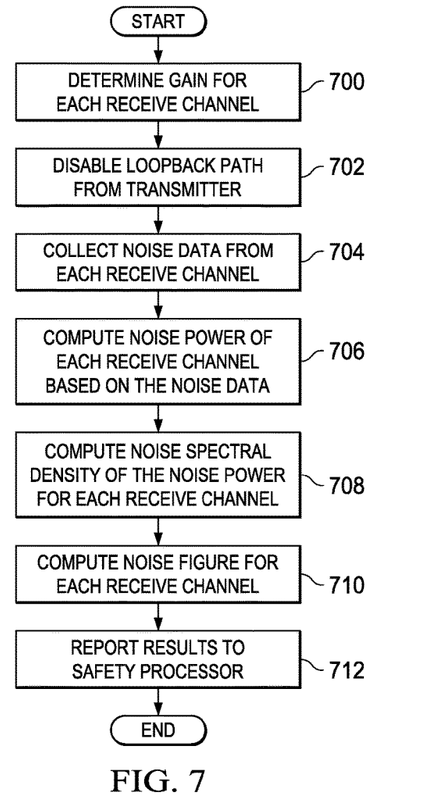

FIG. 7 is a flow diagram of a method for determining a noise figure in a receive channel 202 of the radar SOC 102. This method may be performed, for example, in the example embodiment of FIG. 3 and the example embodiment of FIG. 5. Initially, gain for each of the receive channels is determined 700 as previously described in reference to the method of FIG. 6. The control module 228 then disables 702 the loopback path from the selected transmit channel such that no signal from the transmit channel can reach the receive channels, thus ensuring that only a noise signal reaches the receive channels.

The control module 228 then collects 704 digital noise data from each of the receive channels for a few microseconds and computes 706 the noise power of each receive channel based on the corresponding noise data. In some embodiments, the control module 228 collects the noise data signals from the output of the ADC in each receive channel 202. In other embodiments, the control module 228 collects the noise data signals from an output of the DFE 222.

The noise power for a receive channel i may be computed by performing an FFT on the corresponding noise data and summing the squared magnitude of the FFT outputs. For example, the noise power for a receive channel i may be computed as follows. Assume for ease of explanation that Ns samples of ADC data are collected at a sampling rate Fs, e.g., Ns=1024 and Fs=10.24 MHz, and an Ns point FFT is performed to produce Ns FFT output complex samples referred to as FFTOut[0, 1, 2, ... Ns−1]. The FFT output sample index range, starting from indxMin to indxMax, corresponding to the IF bandwidth of interest for radar signal processing, is given by indexMin=0, indexMax=IFBandwidth/Fs*Ns. The values of FFTOut[indxMin to indxMax] are complex numbers, denoted by X[indx]+jY[indx], where indx=indxMin to indxMax are of relevance. The noise power may be computed as per $$\text{NoisePower} = \Sigma_{indx=indxMin}^{indx=indxMax} X[indx]^2 + Y[indx]^2.$$

Typical values for IFBandwidth are 5 MHz or 10 MHz and depend on the exact radar frequency planning, maximum target distance to scan, FMCW frequency slope, etc. The value of Fs should be chosen higher than IFBandwidth.

The control module 228 then computes 708 the noise power spectral density (PSD) of the noise power of each receive channel. The noise PSD for a receive channel i may be computed as $$\text{NoisePSD}_i = 10 * \log 10(\text{NoisePower}_i/\text{IFBandwidth})$$

where IFBandwidth is the bandwidth of the intermediate frequency (IF). Finally, the control module 228 computes 710 the noise figure (NF) for each receive channel based on the corresponding noise PSD and reports 712 the noise figures to the safety processor. The noise figure $NF_i$ for a receive channel i may be computed as $$NF_i = \text{NoisePSD}_i - \text{Gain}_i.$$

Figure 9:
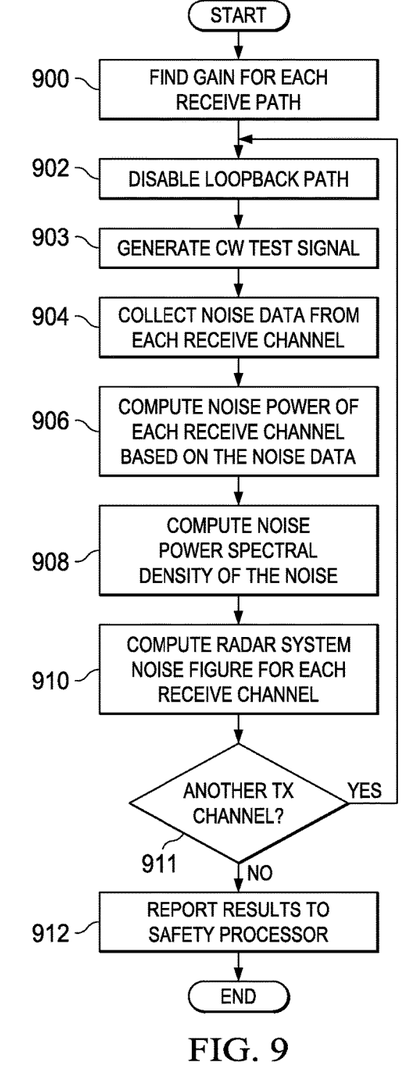

Note that in test mode the shifters 304 and 314 as used in the methods of FIG. 6, FIG. 7, and FIG. 9 provide the frequency shift, IF, on the LO signal to generate the test signal as an input to a receive channel having a frequency offset of IF from the LO RF frequency. Without this frequency shifting, the frequency of the test signal will be the same as that of the LO frequency at the mixer in a receive channel thus causing the test signal at the IFA input to be substantially close to 0 Hz. Typical IFA circuits and ADCs used for radar SOCs have poor performance, i.e., high noise, near 0 Hz but much better performance, i.e., lower noise, at higher frequencies, e.g., a few MHz. The noise near 0 Hz in the IFA and ADC, which may be referred to as flicker noise, has negligible impact at higher frequencies in typical IFA and ADC circuits.

In addition, radar IFA circuits typically include a high pass filter (HPF) and a low pass filter or an effective band pass filter. The HPF in the IFA attenuates very low IF frequencies such as 0 Hz, and less than 500 KHz. Thus, if the test signal has such low frequency, the ADC input and output contain very low amplitude of the test signal and very high amount of noise at similar/close by frequency, corrupting the test signal. A low amplitude of the test signal at the ADC output and high noise power near the IF frequency of the test signal may cause the measurement of the above performance parameters impractical and of low accuracy. Using the shifters 304, 314 to shift the frequency of the LO signal ensures that the test signal that passes through the IFA has a frequency, IF, which is significantly higher than 0 Hz. Hence, the ADC input and output contain significant amplitude of the test signal and relatively lower noise power at a similar/close by frequency.

Figure 10:
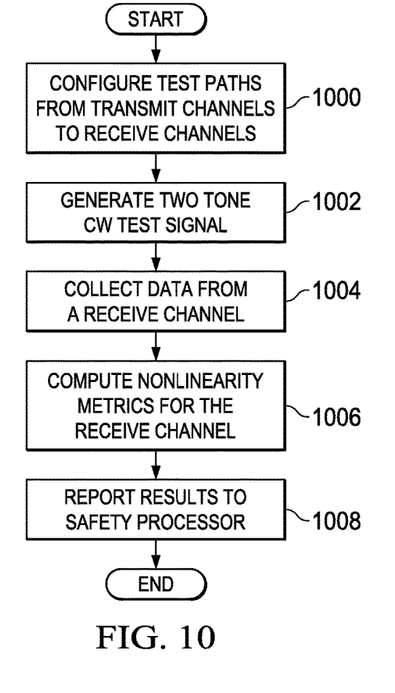

As will be seen in the description of the method of FIG. 10, the shifters 304 and 314 also enable the generation of a multiple tone test signal composed of multiple tones of differing non-zero IF frequencies.

Figure 8:
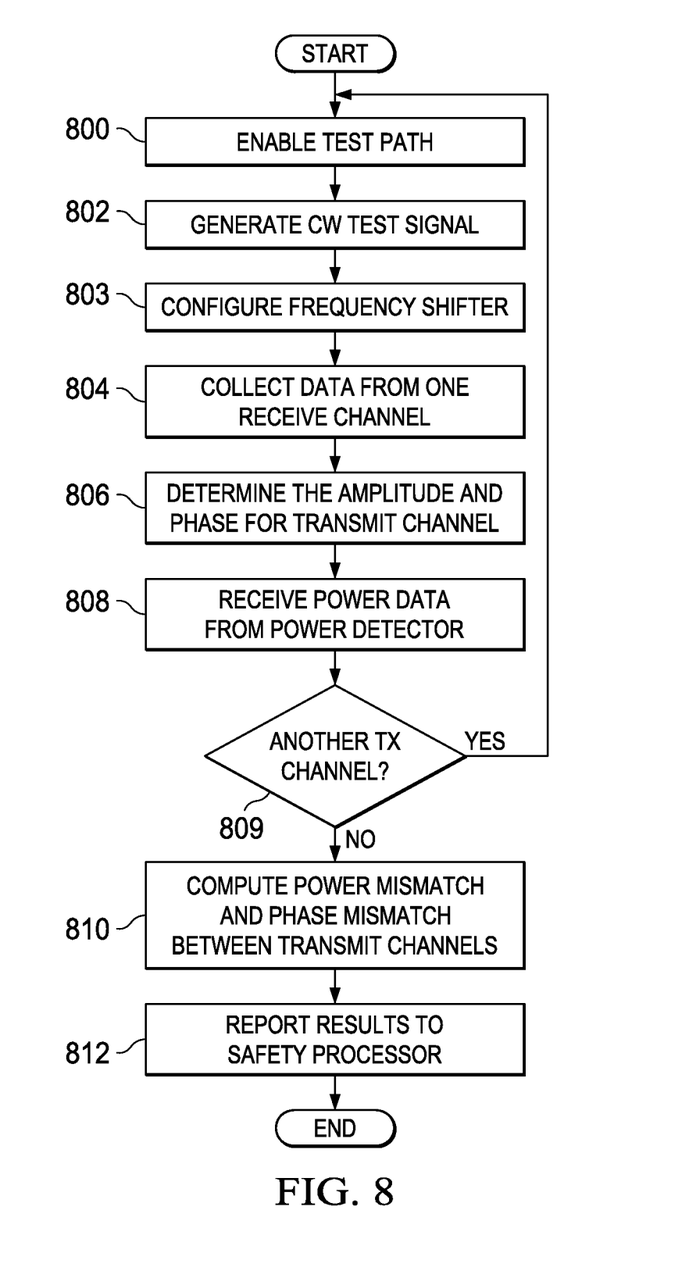

FIG. 8 is a flow diagram of a method for determining power and phase mismatches among the transmit channels 204 of the radar SOC 102. This method may be performed, for example, in the example embodiment of FIG. 4 and the example embodiment of FIG. 5. This method can be performed at any suitable radio frequency. For example, for 77-81 GHz radar, the radio frequency (RF) may be 77, 79, or 81 GHz. In the following description RF=80 GHz is used as an example.

As shown in FIG. 8, the loopback path from one of the transmit channels 204 to the receive channels 202 is enabled 800 by the control module 228. In the example SOC 102 of FIG. 4, the loopback path includes the PPA, Shifter and PA, i.e., the power amplifier chain, of the selected transmit channel, the combiner 402, the frequency shifter 404, and the splitter 320. In the example SOC 102 of FIG. 5, the loopback path also includes the LB combiner 502. Further, the loopback path through the combiner 318 is not enabled. In both embodiments, the other transmit channel is not enabled.

The control module 228 further causes the generation 802 of a continuous wave (CW) test signal, e.g., 80 GHz, that passes through the loopback path from the selected transmit channel. The CW test signal may be generated by setting the frequency of the local oscillator (LO) signal from the SYNTH 230 to 80 GHz and programming the shifter in the power amplifier chain of the selected transmit channel to add a frequency of 0 MHz to the LO signal. The control module 228 also configures 803 the frequency shifter 404 to shift the test signal by an intermediate frequency (IF), e.g., 1 MHz.

The frequency shifted test signal passes through the splitter 320 to the receive channels 202 and the control module 228 collects 804 a digital test data signal from one receive channel. Any one of the receive channels may be selected for the data collection. In some embodiments, the control module 228 collects the test signal from the output of the ADC in the receive channel. In other embodiments, the control module 228 collects the test signal from an output of the DFE 222. The data collection is performed simultaneously and synchronously with the operation of the frequency shifter 404, i.e., the data collection is started at the same time the frequency shifter 404 causes the desired frequency shift in the test signal and continues for a few micro-seconds.

The control module 228 performs a Fast Fourier Transform (FFT) on the test data signal and determines 806 the amplitude $A_i$ and the phase $\theta_i$ (i=1 ... 2) of the received test data signal. Determination of amplitude and phase is previously described herein. Note that in this process, the $A_i$ and $\theta_i$ are the combined amplitude and phase response of the transmit channel i and the selected receive channel at the given RF frequency. The control module 228 also receives 808 power data $P_i$ from the power detector in the transmit channel. The data collection process 800-808 is then repeated 809 for the other transmit channel.

The control module 228 then computes 810 the following performance parameters: power mismatch between transmit channels and phase mismatch between transmit channels. These parameter values and the power of each transmit channel are reported 812 to the safety processor 104. The phase mismatch between two transmit channels i and j may be computed as $$\text{PhaseMismatch}_{i,j} = \theta_i - \theta_j.$$

The power mismatch between two transmit channels i and j may be computed as $$\text{PowerMismatch}_{i,j} = P_i - P_j.$$

Alternatively, the power mismatch between two transmit channels i and j may be computed as $$\text{PowerMismatch}_{i,j} = A_i - A_j$$

if the path including the combiners and the path to the selected receive channel input are matched across transmit channels. In this instance, the measured ADC output amplitude represents only the transmitter power mismatch at the various PA outputs. Compared to the previous power mismatch equation, this equation removes any error in the power measurements from the power detector circuits.

Note that the frequency shifter 404 as used in test mode in the method of FIG. 8 serves a similar purpose as that previously described for the shifters 304, 314. That is, without the frequency shift performed by the frequency shifter 404, the test signal at a receive channel input will be close to 0 Hz, which will be corrupted by the flicker noise in the IFA and ADC. Further, the test signal will be attenuated by the HPF of the IFA of the receive channel and the amplitude of the ADC input and output corresponding to the test signal will be low. The low amplitude of the test signal at the ADC output and the high noise power near the IF frequency of the test signal may cause the measurement of transmit channel gain and phase mismatches to be impractical and of low accuracy.

Further, the frequency shifter 404 after the PA in the transmit channels serves an additional purpose. Note that in order to measure transmit channel gain and phase mismatches, the method of FIG. 8 enables the PA in a transmit channel, which causes external emission of the LO signal. This externally emitted LO signal is reflected by objects surrounding the radar such as the chassis of the radar system or a vehicle in which the radar system is installed. It also electromagnetically couples from the transmit channel antenna to the receive channel antennae. The entire signal received the receive channel due to all the reflections and coupling may be referred to as an external signal. The frequency of the external signal is the same as the RF frequency of the LO signal. Without the frequency shift performed by the frequency shifter 404, the test signal received at the receive channel LNA also has the same frequency same as the LO signal.

If the external signal and the test signal have the same frequency, the two cannot be distinguished when processing the ADC output. Thus, the measurement of transmit channel gain and phase mismatches, etc., from the test signal will be corrupted due to the external signal and the measurements will be erroneous. The frequency shifter 404, by imparting a frequency shift on the PA output signal before the test signal passes to the receive channel LNA, ensures that the frequency of the external signal and the test signal at the LNA input, and, hence at the ADC output, are different. Given the difference in frequency of the two signals at the ADC output, by performing FFT or equivalent digital signal processing, the above method can accurately estimate the transmit channel gain and phase mismatches from the test signal without the estimates being corrupted by the external signal. The external signal will correspond to 0 Hz signal at FFT input and hence, FFT index 0 while the test signal will correspond to frequency, IF and FFT indices as explained above.

FIG. 9 is a flow diagram of a method for determining a radar system noise figure for each combination of a transmit channel and a receive channel of the radar SOC 102. This method may be performed, for example, in the example embodiment of FIG. 3 and the example embodiment of FIG. 5. In this method, rather than using a loopback path for measuring this parameter, a test signal is transmitted by a transmit channel and the receive channels 202 receive this test signal as reflected from nearby static objects such as the chassis of the vehicle in which the radar system is mounted or the chassis of radar system. The radar system noise figure is the average noise power corrupting the received reflected signal. The sources of the noise are both the receive channel and the transmit channel used in measuring the radar system noise figure. While the receive channel noise directly adds to the desired object-reflected input signal, the transmit channel noise corrupts the input signal predominantly through electromagnetic coupling from the transmit antenna to the receive antenna, and through strong reflections from nearby static objects.

Initially, gain for each of the receive channels is determined 900 as previously described in reference to the method of FIG. 6. The control module 228 then disables 902 the loopback path from the selected transmit channel such that no signal from the transmit channel can reach the receive channels through this path. Further, the other transmit channel is not enabled. The control module 228 further causes the generation 903 of a continuous wave (CW) test signal, e.g., RF=80 GHz, that is transmitted by the selected transmit channel. The CW test signal may be generated by setting the frequency of the local oscillator (LO) signal from the SYNTH 230 to 80 GHz and programming the shifter in the power amplifier chain of the selected transmit channel to add a frequency of 0 MHz to the LO signal.

The receive channels 202 receive the test signal as reflected from nearby static objects. The control module 228 collects 904 digital noise data from each of the receive channels for a few micro-seconds and computes 906 the noise power of each receive channel based on the corresponding noise data. In some embodiments, the control module 228 collects the noise data signals from the output of the ADC in each receive channel 202. In other embodiments, the control module 228 collects the noise data signals from an output of the DFE 222. Computation of the noise power for a receive channel i is previously described herein.

The control module 228 then computes 908 the noise power spectral density (PSD) of the noise power of each receive channel. The computed noise power includes the noise introduced by the selected transmit channel and the receive channel. The noise PSD for a receive channel i may be computed as NoisePSD$_i$=10*log 10(NoisePower$_i$/IFBandwidth)

where IFBandwidth is the bandwidth of the intermediate frequency (IF). The control module 228 then computes 910 the radar system noise figure (RSNF) for each receive channel based on the corresponding noise PSD. The radar system noise figure RSNF$_i$ for a receive channel i may be computed as RSNF$_i$=NoisePSD$_i$−Gain$_i$.

The radar system noise figure computations 902-910 are then repeated 911 for the other transmit channel. Finally, the control module 228 reports 912 the computed radar system noise figures for each receive channel/transmit channel pair to the safety processor.

In the above method, the RF frequency used during the collection of ADC samples is substantially constant, i.e., not ramping as in normal FMCW radar operation. Thus, the received signal corresponding to reflections from objects at various distances all have substantially the same frequency, i.e., the same as "RF" mentioned above. During normal operation in a typical FMCW radar, the frequency slope of the transmitted signal is nonzero and the received signal corresponding to reflections from surrounding objects at various distances have frequency equal to RF plus a frequency proportional to the distance of an object. The measured power in the FFT of the ADC output includes power of the reflected signals in addition to the radar system noise, which makes it difficult to distinguish the radar system noise from the power of the reflected signals. In the above method, the use of a constant RF with a zero slope causes the reflections from objects at various distances to occur at the same RF frequency. Further, the corresponding signals are highly attenuated by the high pass filters in the receive channels and the measured power of the output of the ADC closely matches that of the radar system noise.

FIG. 10 is a flow diagram of a method for determining nonlinearity metrics of a receive channel of the radar SOC 102. This method may be performed, for example, in the example embodiment of FIG. 3 and the example embodiment of FIG. 5. The method may be performed at any suitable RF and IF1 and IF2 frequencies. For example, for 77-81 GHz radar, RF may be 77, 79, or 81 GHz and the IF1 and IF2 frequencies may be IF1=2 MHz, IF2=2.5 MHz. In the description of the method, RF=80 GHz, IF1=2 MHz, IF2=2.5 MHz are used for example purposes. In some embodiments, the IF1 and IF2 frequency values are chosen such that m*IF1+n*IF2, where m is one or more of +/−1, +/−2, +/−3, . . . and n is one or more of +/−1, +/−2, +/−3, . . . and m and n are not integer multiples of IF1 or IF2.

An ideal receive channel generates a signal at the ADC output that is solely a scaled version of the received signal. That is, if the LNA input signal is x, the ADC output signal is k*x in which the frequencies are down shifted from RF to IF. Such an ideal receive channel may be referred to as a linear receive channel. A non-ideal, i.e., nonlinear, receive channel generates k*x+k$_2$*x$^2$+k$_3$x$^3$+ . . . at the ADC output. The effect of this nonlinearity in an FMCW radar system is that rather than detecting an actual object reflection corresponding to the k*x term, the FMCW radar signal processor is fooled into falsely detecting absent objects as present at distances corresponding to k$_2$*x$^2$ and k$_3$*x$^3$. Further, in the presence of multiple reflections, a linear receive channel generates k*x1+k*x2 at ADC output. But a nonlinear receive channel generates additional terms such as k$_{31}$*x$_1^3$*x$_2^2$ which causes the FMCW radar signal processor to falsely detect absent objects as present at corresponding distances. This method determines nonlinearity metrics which the safety processor can compare to thresholds to detect corruption/faults in the receive channels.

The method presented addresses computation of nonlinearity metrics for a single receive channel. The method may be repeated to compute nonlinearity metrics for other receive channels. Alternatively, one of ordinary skill in the art will understand embodiments in which the nonlinearity metrics are computed for all receive channels based on a single transmission of the two tone test signal, i.e., the two tone test data signal is collected from each of the receive channels and nonlinearity metrics are computed for each receive channel.

As shown in FIG. 10, initially the control module 228 configures 1000 the test paths (loopback paths) from the transmit channels 204 to the receive channels 202. In the example SOC 102 of FIG. 3, the loopback path of a transmit channel includes the PPA and shifter of the transmit channel, the combiner 318, and the splitter 320. In the example SOC 102 of FIG. 5, the loopback path also includes the LB combiner 502. Further, the control module 228 causes the shifter of one transmit channel to frequency shift by the IF1 frequency and the shifter of the other transmit channel to frequency shift by the IF2 frequency.

The control module 228 further causes the generation 1002 of a two tone continuous wave (CW) test signal of 80 GHz that passes through the enabled test paths of the transmit channels to the receive channels 202. The two tone CW test signal may be generated by setting the frequency of the local oscillator (LO) signal from the SYNTH 230 to 80 GHz. The shifter programmed to frequency shift by the IF1 frequency will propagate a signal of 80 GHz+IF1 and the shifter programmed to frequency shift by IF2 will propagate a signal of 80 GHz+IF2, thus providing the two tone test signal at the LNA input of the selected receive channel.

The control module 228 then collects a digital two tone test data signal from one of the receive channels. In some embodiments, the control module 228 collects the test signal from the output of the ADC in the receive channel. In other embodiments, the control module 228 collects the test signal from an output of the DFE 222.

The control module 228 then computes 1006 nonlinearity metrics for the receive channel based on the received two tone test data signal. To compute the nonlinearity metrics, the control module performs an FFT of the test data signal and computes the magnitudes M1, M2, Mmn of the two tones in the FFT output at the following frequencies: IF1, IF2, m*IF1+n*IF2, where m is one or more of +/−1, +/−2, +/−3, . . . and n is one or more +/−1, +/−2, +/−3, . . . . This FFT may be performed as follows. Assume for ease of explanation that Ns samples of ADC data are collected at a sampling rate Fs, e.g., Ns=1024 and Fs=10.24 MHz, and an Ns point FFT is performed to produce Ns FFT output complex samples referred to as FFTOut[0, 1, 2, . . . Ns−1]. The FFT output sample indices, {indx1, indx2, indxmn}, corresponding to the frequencies {IF1, IF2, m*IF1+n*IF2} are given by {IF1/Fs*Ns, IF2/Fs*Ns, (m*IF1+n*IF2)/Fs*Ns}. The value of FFTOut[indxi] is a complex number, denoted by (X+jY). The magnitude M of this number is given by $M=\text{sqrt}(X^2+Y^2)/Ns$. Thus, the values of M1, M2, and Mmn corresponding to respective indices indx1, indx2, indxmn can be found.

Note that M1 and M2 correspond to the two tones, x1 and x2, provided to the receive channel at frequencies RF+IF1 and RF+IF2, and Mmn corresponds to intermodulation products $k_{mn}*x_1^m*x_2^n$ created by a nonlinear receive channel. Note also that the values of M1 and M2 are significant. Further, in an ideal receiver, the values of the Mmn are close to 0 because an ideal receive channel does not cause intermodulation products. However, in a nonlinear receive channel, the values of the Mmn may not be 0 and may be a few orders of magnitude lower than M1 and M2. Lower values of the Mmn indicate better performance of the receive channel.

Given M1, M2, and Mmn, the control module 228 computes M1_dB=20*log 10(M1), M2_dB=20*log 10(M2), and Mmn_dB=20*log 10(Mmn) to convert these values to decibels. Using the resulting converted values, the control module 228 computes values for nonlinearity metric (NM) and reports 1008 these metric values to the safety processor. Example of two nonlinearity metrics that may be computed are as follows:

$$NM1=M1\_dB+0.5*M2\_dB-0.5*M12\_dB$$

$$NM2=M1\_dB+M2\_dB-M11\_dB.$$

Other nonlinearity metrics may be similarly computed as weighted sums of M1_dB, M2_dB, Mmn_dB or products of M1, M2, Mmn. Low values of the NMi indicate that the intermodulation products are high in the receive channel as the value of an NMi is high if the value of Mmn is significantly lower than the values of M1 and M2.

Note that the generation of the two tones x1 and x2 from two different transmit channels allows the intermodulation products created by the receive channel (which operates on the combined signal k1*x1+k2*x2) to be distinguished from any additional tones caused by nonlinearity in the individual transmit channels (each of which operates on only one of the two signals, x1 and x2). The additional tones caused by nonlinearity in the individual transmit channels causes additional terms such as $x1^2$, $x1^3$, $x1^4$, . . . and correspondingly for x2 in the signal input to the receive channel. The method avoids the corruption of the intermodulation products, Amn, of interest by these terms by ensuring that the frequencies of intermodulation products Amn do not coincide with the frequencies of these terms.

The method of FIG. 10 assumes two transmit channels and a two tone test signal for simplicity of explanation. The method may be extended to use more than two transmit channels, with each transmit channel programmed to generate a different frequency shift, i.e., IF1, IF2, IF3, . . . . The FFT indices corresponding to the intermodulation products of the multiple tones are observed to compute nonlinearity metrics. The values selected for IF1, IF2, IF3, . . . to mitigate non-linearity in the transmit channel should be such that multiples of IF1, IF2, IF3, . . . that do not coincide with the frequency of intermodulation products, which will be m*IF1+n*IF2+p*IF3, where m, n, p are integers, 0, +/−1, +/−2, . . . .

In another embodiment of the method of FIG. 10, the outputs of shifters 304 and 314 are configured to reach the respective LNAs of the receive channels through different paths. For example, the output of shifter 304 may be configured to reach the LNAs of the receive channels through the combiner 318 and LB combiner 502 with PA 306 disabled and the output of shifter 314 may be configured to be transmitted via the PA 316 and the corresponding antenna. This latter signal reaches the LNAs of the receive channels through reflections from external objects, e.g., a vehicle or radar chassis, and/or electromagnetic coupling from the transmit antenna to the receive antennae. Further, the IF frequency of shifter 314 is programmed similar to the frequency offset corresponding to nearby strong reflections from external objects and/or electromagnetic coupling that are observed during normal FMCW radar operation, e.g., 10 KHz, and the IF frequency of shifter 304 is programmed corresponding to objects of medium reflection strength and medium distance, e.g., a few MHz.

In this embodiment, the tone through the external antenna path is of much higher amplitude than is realizable through the intra-chip loopback path and may better mimic the strength of the signal during actual radar operation. Further, with only one of the PAs enabled, the strength of any undesired intermodulation products generated by the transmit circuits and the loopback paths is reduced, thus improving the detection and estimation of intermodulation products generated by the receive channels.

In another embodiment of the method of FIG. 10, the output of shifters 304 and 314 may be configured may be configured to be transmitted via the respective PAs and antennae. The transmitted signals reach the LNAs of the receive channels through reflections from external objects, e.g., a vehicle or radar chassis, and/or electromagnetic coupling from the transmit antennae to the receive antennae. Further, the IF frequency of shifter 314 is programmed similar to the frequency offset corresponding to nearby strong reflections from external objects and/or electromagnetic coupling that are observed during normal FMCW radar operation, e.g., 10 KHz, and the IF frequency of shifter 304 is programmed corresponding to objects of medium reflection strength and medium distance, e.g., a few MHz. In addition, the output power of PA 306 is kept high such that the magnitude of the reflected signal received by the LNAs is similar to that of nearby strong reflections from external objects and/or electromagnetic coupling that are observed during normal FMCW radar operation and the output power of PA 316 is kept high such that the magnitude of the reflected signal reaching the LNAs is similar to that of objects of medium reflection strength and medium distance.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the processing of the signals to determine parameter values is performed in a control module on a radar SOC. One of ordinary skill in the art will understand embodiments in which some or all of the signal processing is performed external to the SOC, e.g., by the processing unit or by an external MCU.

In another example, embodiments have been described herein in which the safety processor is external to the radar SOC. One of ordinary skill in the art will understand embodiments in which the safety processor is part of the radar SOC, e.g., is the control processor or another processor on the SOC.

In another example, embodiments have been described herein in which the LO signal output by the SYNTH is provided to PPAs in the transmit channels and to the mixers in the receive channels. One of ordinary skill in the art will understand embodiments in which an LO distribution network is used. In general, an LO distribution network is a tree of cells that communicates the LO signal to the mixers of the receive channels and the shifters of the transmit channel. The cells may be, for example, wires or amplifiers such as the PPAs or frequency multipliers or frequency dividers.

In another example, embodiments have been described herein in which a clock multiplier is used. One of ordinary skill in the art will understand embodiments in which the multiplier is not needed because the SYNTH operates at the LO frequency rather than a lower frequency.

In another example, embodiments have been described herein in which the transmission signal generation circuitry is assumed to include a radio frequency synthesizer. One of ordinary skill in the art will understand embodiments in which this circuitry includes an open loop oscillator (radio frequency oscillator) plus a digital-to-analog converter (DAC) or other suitable transmission signal generation circuitry.

In another example, method embodiments have been described herein in which noise power spectral density (PSD) is computed. One of ordinary skill in the art will understand embodiments in which an alternative to the previously mentioned equation for computing noise PSD is used for computing the noise PSD. Noise PSD in any frequency band can be computed using the FFT outputs corresponding to the frequency band and using the difference in the upper and lower limit frequencies of that frequency band as "IFBandwidth" in the previously mentioned equation. This is useful when the Noise PSD is expected to be different in different frequency bands.

In another example, method embodiments have been described herein in which the noise figure $NF_i$ for a receive channel i is computed with respect to the gain of the receive channel. One of ordinary skill in the art will understand embodiments in which the noise figure is determined irrespective of the gain in the receive channel, i.e., $$NF_i = NoisePSD_i.$$

In another example, method embodiments have been described herein in which the radar system noise figure $RSNF_i$ for a receive channel i is computed with respect to the gain of the receive channel. One of ordinary skill in the art will understand embodiments in which the radar system noise figure is determined irrespective of the gain in the receive channel, i.e., $$RSNF_i = NoisePSD_i.$$

In another example, embodiments have been described herein in reference to an example FMCW radar SOC. One of ordinary skill in the art will understand embodiments for other types of radar, such as, for example, constant frequency, stepped frequency, and triangular frequency radar.

In another example, one of ordinary skill in the art will understand embodiments embodiments in which the radar SOC periodically and automatically operates in test mode to monitor one or more of the performance parameters. In some such embodiments, the radar SOC may operate in normal mode for a fixed period of time to transmit and receive a frame of chirps. During time periods between frames, the radar SOC automatically operates in test mode to monitor one or more of the performance parameters. For example, operation in normal mode may occur for 100 microseconds and operation in test mode may occur for 80 microseconds with repetition once every 500 microseconds. In another example, the durations may be 5 milliseconds, 3 milliseconds, and 40 milliseconds, respectively.

In another example, embodiments have been described herein assuming that there is more than one transmit channel. One of ordinary skill in the art will understand embodiments in which there is a single transmit channel or in which only one transmit channel is used. In such embodiments, the combiners may or may not be present. If a combiner is coupled to a single transmit channel, the output signal of the combiner is the input signal of the combiner. In such embodiments, one or more performance parameters such as, for example, receive channel gain, receive channel phase, inter receive channel gain and phase mismatches, receive channel noise figure, and radar system noise figure, may be computed.

In another example, embodiments have been described herein assuming that there is more than one receive channel. One of ordinary skill in the art will understand embodiments in which there is a single receive channel or in which only one receive channel is used. In such embodiments, the splitter may or may not be present. If the splitter is present, the splitter output is coupled only to the single receive channel. In such embodiments, one or more performance parameters such as, for example, transmit channel gain, transmit channel phase, inter transmit channel gain and phase mismatches, receive channel noise figure, and radar system noise figure, may be computed.

In another example, embodiments have been described herein in which all receive channels are coupled to the splitter and all transmit channels are coupled to at least one combiner. One of ordinary skill in the art will understand embodiments in which a subset of the receive channels are coupled to the splitter and/or a subset of the transmit channels are coupled to at least one combiner. In such embodiments, one or more of the previously described methods to determine performance parameters may be performed.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A radar system-on-a-chip (SOC) configured for monitoring one or more performance parameters, the radar SOC comprising:
   two or more receive channels;
   two or more transmit channels; and
   transmission generation circuitry coupled to the two or more transmit channels, the transmission generation circuitry operable to generate a continuous wave signal when the radar SOC is operated in test mode.

* * * * *